(12) United States Patent
Matsumura et al.

(10) Patent No.: US 6,229,291 B1
(45) Date of Patent: May 8, 2001

(54) CURRENT SHARING CONTROL SYSTEM OF POWER SUPPLY AND OUTPUT VOLTAGE SENSING CIRCUIT

(75) Inventors: Hideaki Matsumura; Hiroyuki Murakami, both of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/607,263

(22) Filed: Jun. 30, 2000

(30) Foreign Application Priority Data

Jul. 28, 1999 (JP) .................................................. 11-214037
Apr. 14, 2000 (JP) .................................................. 12-113195

(51) Int. Cl.$^7$ ...................................................... G05F 1/40
(52) U.S. Cl. ............................................................ 323/282
(58) Field of Search ...................................... 323/266, 270, 323/271, 282, 285, 286, 287; 363/39, 40, 41; 307/52, 53, 60, 69

(56) References Cited

U.S. PATENT DOCUMENTS 3,710,254 * 1/1973 Kusui ...................................... 324/142
5,862,044 * 1/1999 Shioya et al. .......................... 363/21
5,939,991 * 8/1999 Deng ...................................... 340/638

* cited by examiner

*Primary Examiner*—Matthew Nguyen
(74) *Attorney, Agent, or Firm*—Moonray Kojima

(57) ABSTRACT

A current sharing control system of a power supply, wherein a plurality of switching power supplies are connected in parallel to feed DC power to an external load. Each switching power supply comprises an output current sensing circuit for obtaining a signal corresponding to the output current of the power supply; an ideal diode circuit comprising an anode coupled to receive a signal corresponding to the output current and a cathode coupled to receive a signal corresponding to the maximum output current of the plurality of parallel connected switching power supplies; an error amplifier for outputting an error signal representing difference between the anode and cathode potentials of the ideal diode circuit; and an output voltage regulator for adjusting the output voltage thereof to cancel the error signal. Advantageously, the system enables the output currents of the plurality of parallel connected power supplies to be maintained at the same level, thereby preventing variations in output voltage when any one or more of the switching power supplies fail, or are connected or disconnected while the power line is active. Also, advantageously, the system enables control of variations of current to be within a certain range when short circuit or open circuit of a parallel operation control signal of the system occurs.

8 Claims, 8 Drawing Sheets a
CURRENT SHARING CONTROL SYSTEM OF POWER SUPPLY AND OUTPUT VOLTAGE SENSING CIRCUIT

BACKGROUND OF THE INVENTION

1. Field of Invention

This invention relates to a current sharing control system of a power supply, wherein a plurality of switching power supplies are connected in parallel to feed DC power to an external load.

2. Description of the Prior Art

A conventional current sharing control system of a power supply using a plurality of switching power supplies to supply DC power to an external load is shown in FIG. 1, wherein a convention switching power supply 10 is used as the power supply system and comprises an output current sensing circuit 1 for outputting an output current sensing signal, corresponding to the circuit's output current. The sensing circuit 1 is connected to the negative input terminal of an error amplifier U2 through a resistor R12. Also, an output voltage sensing circuit 2, which outputs an output voltage sensing signal, corresponding to the circuit output voltage, is connected to the negative input terminal of an error amplifier U1.

The positive input terminal of the error amplifier U1 is connected to a voltage reference Vr1 and the amplifier output terminal is connected to the anode of diode D. The cathode of diode D is connected to both the negative input terminal of error amplifier U2, through a resistor R11, and a parallel operation control signal terminal CT. The positive input terminal of error amplifier U2 is connected to a reference voltage Vr2 and the output terminal thereof is connected to a switching regulator 3.

The switching regulator 3 is a DC power supply circuit, whose output current is controlled by the output of error amplifier U2. The switching regulator 3 comprises a pulse width modulation circuit 3a, that modulates the output of error amplifier U2 by pulse width, and a switching converter 3b, that inputs the output of pulse width modulation circuit 3a to a switching device. The output of switching converter 3b is connected to output terminals OUT+ and OUT−. The output terminals CT, OUT+ and OUT− of the plurality of switching power supplies 10,10a, and 10b, as described above, are connected in parallel as depicted in FIG. 2, in order to supply power to a load 50. The sum of the output currents of the switching power supplies 10, 10a and 10b is thus supplied to load 50. Although FIG. 2 shows the case of three switching power supplies 10,10a,10b connected in parallel, it is possible to increase or decrease the number of power supplies according to the current capacity required by load 50.

In each switching power supply, connected as shown in FIG. 2, a voltage signal, which corresponds to the power supply output current, detected by the output current sensing circuit 1 of the power supply (called output current sensing signal Vc) is compared with the voltage of the voltage reference Vr1 by means of the error amplifier U1 (see FIG. 1). The resulting comparison signal is outputted to parallel operation control signal terminal CT through diode D.

Since the parallel operation control signal terminals CT of the plurality of switching power supplies 10,10a, 10b are connected in parallel, the highest level of signals outputted from the terminals CT of the parallel connected switching power supplies (called parallel operation control signals Vp) is supplied to the resistor R11 of each switching power supply by the operation of diode D. The switching power supply that outputs the highest level parallel operation control signal Vp serves as a master switching power supply for controlling the other switching power supplies.

For each parallel connected switching power supply, a parallel operation control signal Vp outputted by the master switching power supply is added to the output current sensing signal Vc of the parallel connected switching power supply by means of resistors R11 and R12, and error amplifier U2. The resulting addition signal is compared with the reference voltage Vr2, and the resulting comparison output signal is fed to switching regulator 3 through error amplifier U2.

The switching regulator 3 of each switching power supply controls the power supply output current according to the comparison output signal supplied by error amplifier U2. Thus, in the current sharing control system of the power supply,described above, it is possible to control the output currents of the parallel connected plurality of switching power supplies, to substantially the same level by setting the power supplies reference voltage Vr2 to the same value.

As discussed, in the conventional current sharing control system of a power supply, it is possible to control the output currents of a plurality of parallel connected switching power supplies to the same level with accuracy. However, the conventional systems have a problem, namely, that if a switching power supply, serving as the master switching power supply, fails or is connected or disconnected while the power line is active, the output voltage variation becomes unacceptably large for a short period of time during which another switching power supply takes the place of the master switching power supply.

Furthermore, disadvantageously, in the conventional system, the output voltage of the switching power supply, other than the master switching power supply, is not directly controlled. Instead, the concerned power supply is controlled in such a manner that the sum of the parallel operation control signal and the power supply output current is kept constant. This results in a problem, namely, that the output voltage variation becomes unacceptably large when an output voltage sensing circuit, such as a current transformer, which involves a certain delay of detection, is used.

SUMMARY OF THE INVENTION.

Accordingly, an object of the invention is to overcome the aforementioned and other disadvantages and deficiencies of the prior art.

Another object is to provide a current sharing control system of a power supply that enables the output currents of a plurality of parallel connected switching power supplies to be maintained at the same level, thereby preventing output voltage variations in the power supplies from occurring in the event any one or more switching power supplies fail, or are connected, or disconnected while the power line is still active.

A further object is to provide such system which enables control of the output voltage variations to be within a certain range when short circuiting or open circuiting occurs in a parallel operation control signal used in such system.

DETAILED DESCRIPTION OF THE PREFERRED EMBODIMENTS

Figure 1:
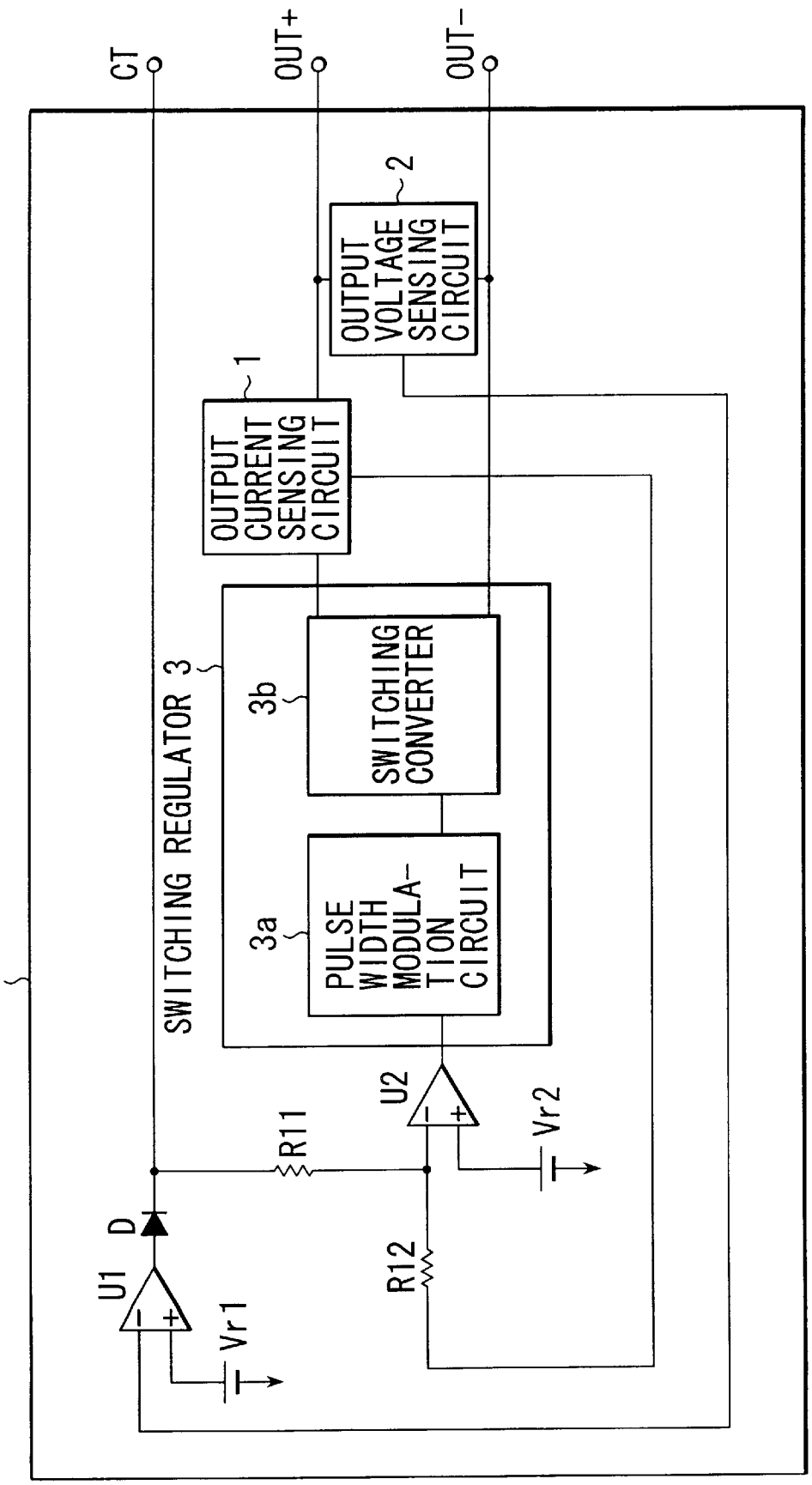
FIG. 1 is a block diagram depicting a conventional switching power supply.
Figure 3:
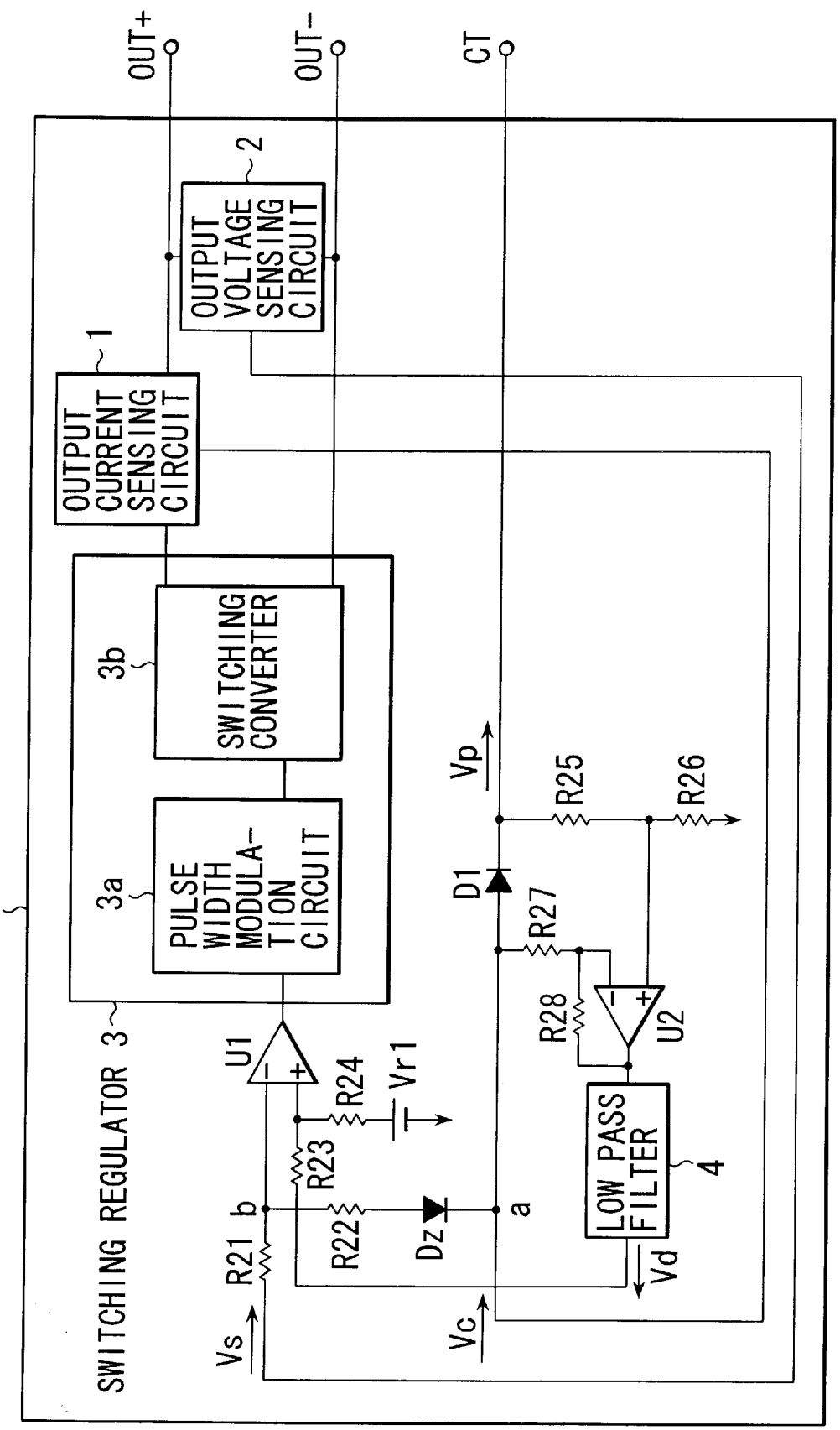
FIG. 3 is a block diagram depicting an illustrative embodiment of a switching power supply of the invention.

FIG. 3 shows an illustrative embodiment of a switching power supply used for a current sharing control system of a power supply, wherein components that are the same as those in FIG. 1 are similarly labelled and are not discussed here at for sake of clarity. In FIG. 3, an output terminal of the output current sensing circuit 1, of power supply 20 is connected to the anode of an ideal diode circuit D1. The cathode of diode D1 is connected to a parallel operation control signal terminal CT. The anode of diode D1 is connected to the negative input terminal of an error amplifier U2 through a resistor p27. The cathode of diode circuit D1 is connected to voltage dividing resistors R25 and R26. The common junction between the resistors R25 and R26 is connected to the positive terminal of error amplifier U2.

Figure 4:
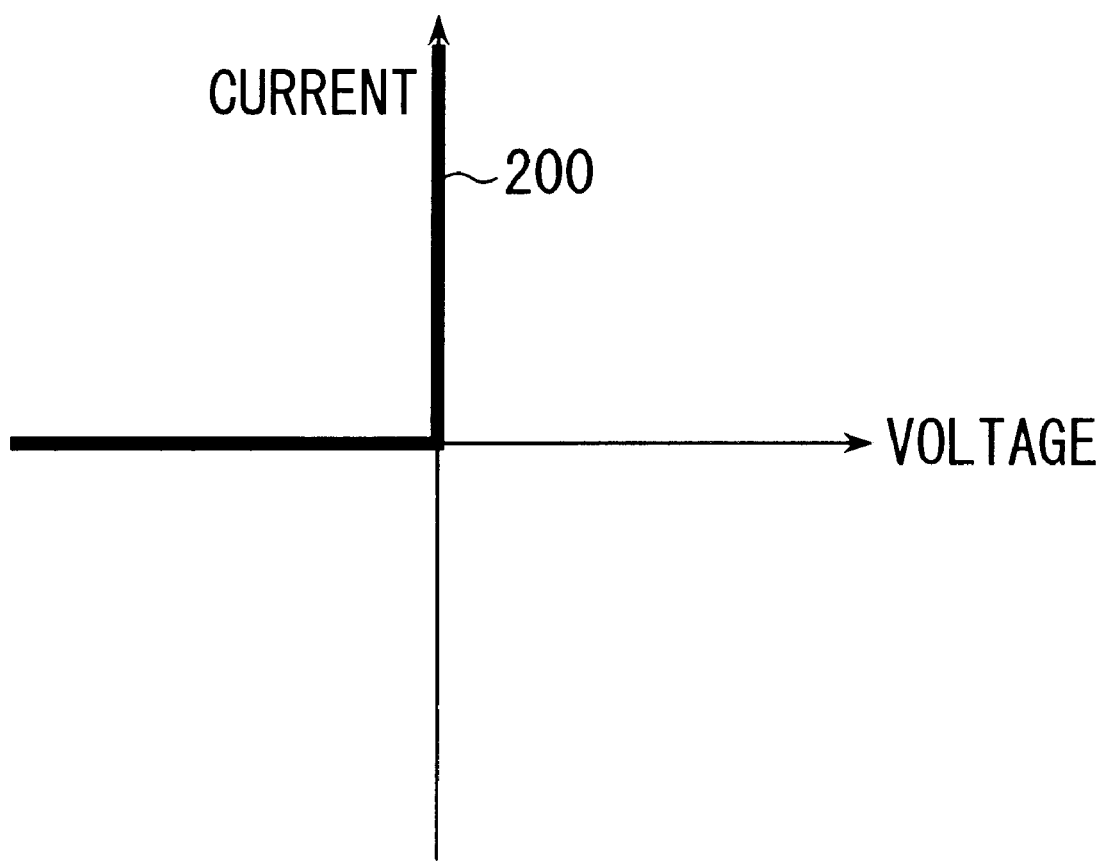
FIG. 4 is a schematic diagram depicting characteristics of an ideal diode circuit of the invention.

The ideal diode circuit refers to a diode that has the characteristics of a standard ordinary diode even when the range of applied forward voltage is as narrow as from 0 to 0.5 volts. On the other hand, the standard ordinary diode does is not turned ON, that is pass current , unless a voltage of approximately 0.6 volts is applied in the forward direction FIG. 4 shows characteristics of an ideal diode circuit D1. As is evident from the characteristic curve 200, the ideal diode circuit is characteristically equivalent to a switching circuit that is turned ON when voltage is applied in the forward direction and is turned OFF when voltage is applied in the reverse direction.

Figure 5:
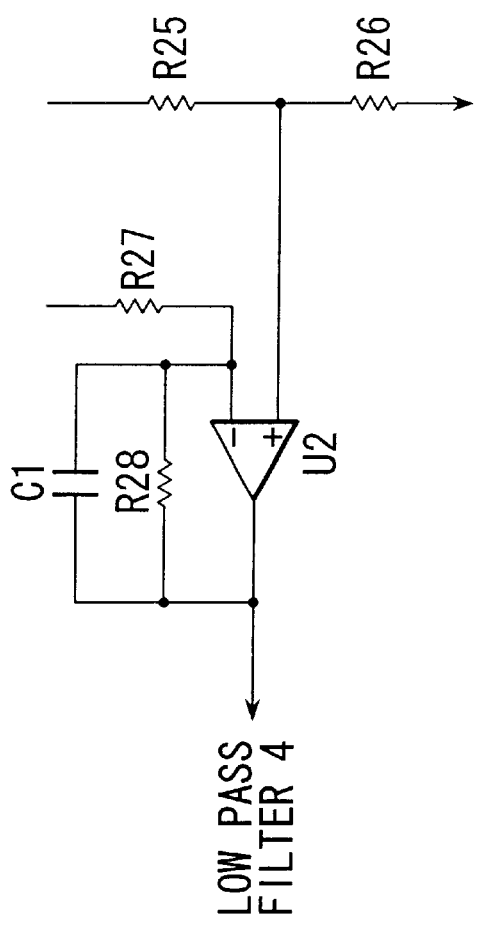
FIGS. 5A and 5B are schematic diagrams depicting an ideal diode circuit of the invention.

An ideal diode circuit D1 can be realized, for example, by the circuit shown in FIG. 5A, wherein an input terminal 41 is connected to the positive input terminal of error amplifier U4. The output terminal of error amplifier U4 is connected to an output terminal 43 through diode 42. The common junction between the cathode of diode 42 and the output terminal 43 is connected to the negative input terminal of error amplifier U4. In such an ideal diode circuit, the input terminal 41 serves as an anode and the output terminal 43 serves as a cathode.

Figure 7:
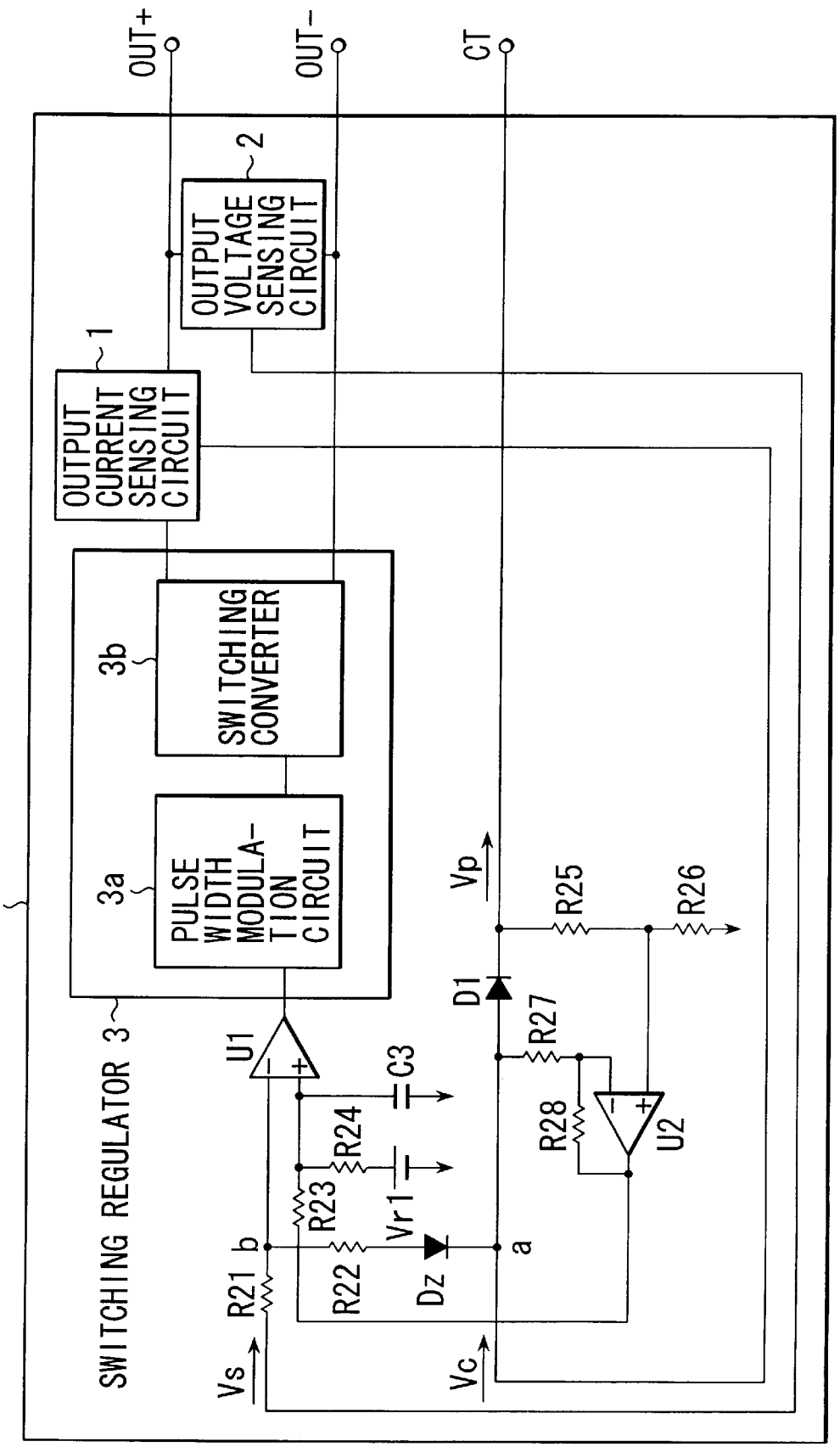
FIG. 7 is a block diagram depicting a low pass filter of the invention.

In FIG. 3, the output terminal of error amplifier U2 is connected to both low pass filter 4 and the negative input terminal of error amplifier U2 through feed back resistor R28. The low pass filter 4 can be realized by feeding back the output signal from error amplifier U2 through a capacitor C1, for example, as shown in FIG. 5B. Alternatively, the low pass filter 4 can be realized, for example, by connecting the positive input terminal of error amplifier U1 to a common potential through a capacitor C3, such as shown in FIG. 7.

Figure 2:
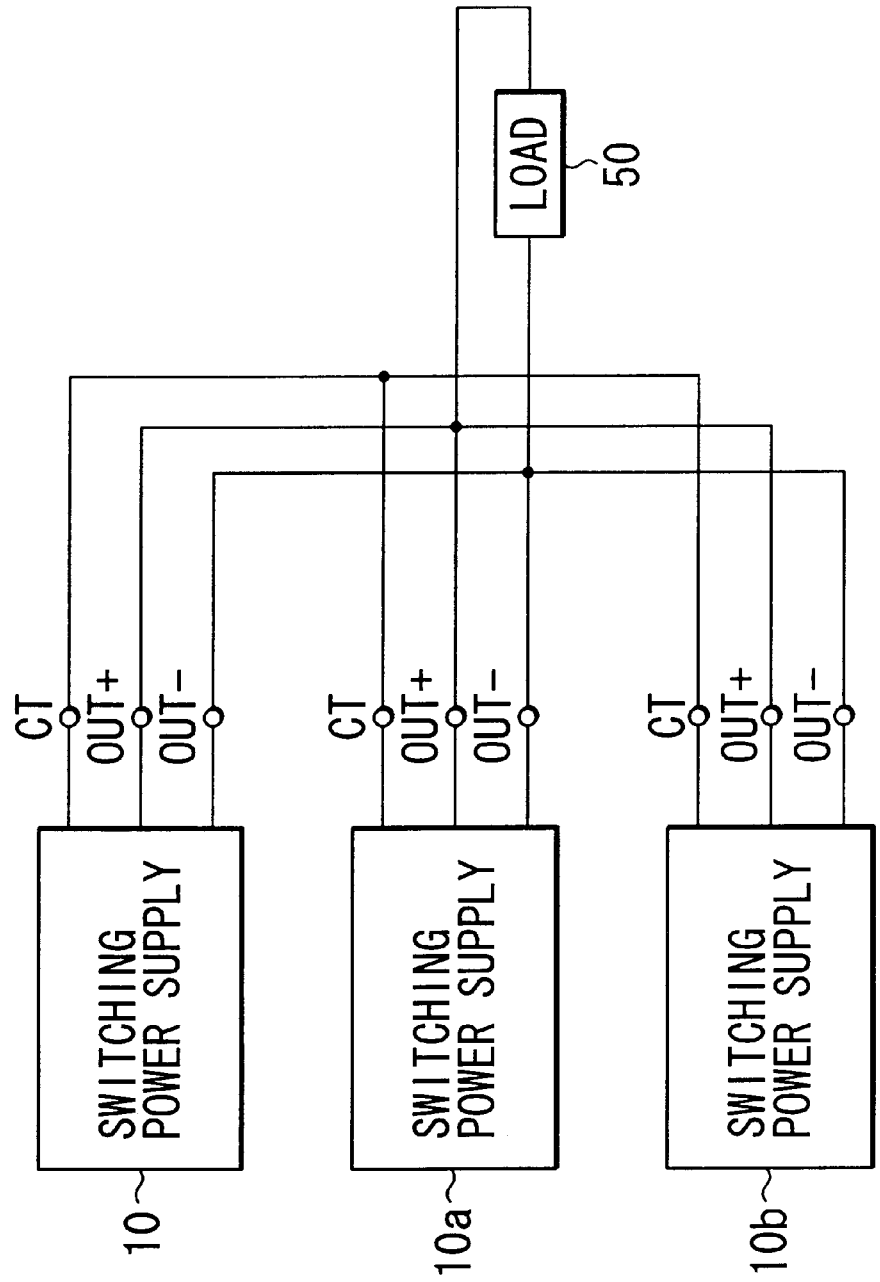
FIG. 2 is a block diagram depicting a conventional current sharing control system of a power supply.

In FIG. 3, the output terminal of the output voltage sensing circuit 2 is connected to the negative input terminal of error amplifier U1 through resistor R21. The output terminal of low pass filter 4 is connected to the positive input terminal of error amplifier U1 through resistor R23. The common junction "b" between the negative input terminal of error amplifier U1 and resistor R21 is connected to the anode of the ideal diode circuit D1 , at the point indicated by "a" in FIG. 3, through resistor R22 and Zener diode Dz which are connected in series. The common junction between the positive input terminal of the error amplifier U1 and the resistor R23 is connected to the common potential through a resistor 24 and a reference voltage Vr1 connected in series. In this specification, reference is often made to a connection to a signal. It is to be understood that this means that a connection is made to a means which carries such signal. The output terminal of error amplifier U1 is connected to the switching regulator 3 in the same way as a conventional system. The output terminal,CT, OUT– and OUT+ of the plurality of switching power supplies 20 are connected in parallel, as shown in FIG. 2, in order to feed DC power to a load 50. Hence, the sum of output currents provided by the switching power supplies 10, 10a and 10b is applied to the load 50. If a plurality of switching power supplies 20 are connected parallely, as shown in FIG. 2, an output current sensing signal Vc obtained by an output current sensing circuit 1 is supplied to a parallel operation control signal terminal CT through the ideal diode circuit D1 as a parallel operation control signal Vp(see FIG. 3). Since the parallel operation control signal terminals CT of all of the plurality of switching power supplies are connected in parallel,the highest level of parallel operation control signals Vp provided by the plurality of parallel connected switching power supplies is applied to resistor R25. The particular switching power supply that outputs the highest level parallel operation control signal Vp serves as the master switching power supply for controlling the output signal of the other switching power supplies.

Each of the plurality of parallel connected switching power supplies compares a parallel operation control signal Vp outputted by the master switching power supply with its own output current signal Vc by means of error amplifier U2. The switching power supply then feeds the resulting comparison output signal to low pass filter 4. The output of low pass filter 4 is added to the reference voltage Vr1 borough resistors R23 and R24. Then, the resulting addition signal is supplied to the positive input terminal of error amplifier U1. Since an output voltage sensing signal Vs, corresponding to the output voltage of error amplifier U1, is supplied to the negative input terminal of error amplifier U1, the switching power supply controls the switching regulator 3 so as to increase its own output current when the output current is smaller than that of the master switching power supply. Conversely, the switching power supply controls the switching regulator 3 so as to decrease its own output current when the output current is larger than that of the master switching power supply.

A The output currents of the switching power supplies are controlled so that they are kept equal over a certain range defined by the degree of amplification of error amplifier U2 and resistors R23, and R24. The time required for the output current of each switching power supply to reach the same level, that is the settling time, is dependent on the time constant of the low pass filter 4. If the time constant is set to a value far greater than the time constant for controlling the output voltage, which is usually determined by connecting a CR circuit across the input and output terminals of the error amplifier U1 for phase compensation, by a factor of 100 or more, for example, the tracking of a sudden change in the load is started only by the system of controlling the output voltage of each switching power supply. This method makes it possible to minimize output voltage variations.

Although it is possible to minimize the output voltage variation by the tracking of the sudden change in the load, this tracking is not limited to the foregoing method alone. The ratio of output current shared by each switching power supply depends solely on the dynamic impedance thereof. Hence, if the dynamic impedance is not equal for the plurality of switching power supplies, such as for reasons of variations during manufacture, a switching power supply having the lowest dynamic impedance will provide a current corresponding to the sudden change in load. This will result in a remarkable increase in the electrical stress of that switching power supply. This problem can be prevented by using a Zener diode Dz and resistors R21,R22 that form an addition resistor network.

An output current sensing signal Vc corresponding to the output current is supplied to the junction "a" of the cathode of the Zener diode Dz. When the voltage level of the output current sensing signal Vc exceeds the Zener voltage of the Zener diode Dz, the extra voltage level is divided in a ratio determined by the resistors R21 and R22. Then, the resulting voltage level is supplied to the negative input terminal of error amplifier U1. Consequently, the switching regulator 3 is operated so as to decrease its own output current. More specifically, when the output current exceeds a certain current level defined by the Zener voltage of Zener diode Dz, the switching power supply output current is decreased by means of Zener diode Dz and resistors R21, R22, forming an addition resistor network, according to a ratio determined by the resistors R21 and R22, against a change in excess of that current level. This makes it possible to prevent any excess current from being supplied to the switching power supply.

Assume that the output voltage Vd of the low pass filter 4, or error amplifier U2, is within the range of from 0 to 1 volt. Then, the input voltage, which is the reference voltage level of the output voltage, of the error amplifier U1, when the output voltage is 0 volt, is:

$$R23/(R23+R24)\times Vr1 \qquad (1)$$

When, the output voltage Vd is 1 volt, the input voltage of the error amplifier U1, is:

$$R23/(R23+R24)\times Vr1+R24/(R23+R24)\times Vr1 \qquad (2)$$

This means that it is possible to freely determine the variable range of the output voltage of each switching power supply by suitably selecting the values of resistors R22 and R24.

Hence, the output voltage of each switching power supply never exceeds the variable output voltage range determined by the resistors R23 and R24, whether the parallel operation control signal Vp is open circuited, or short circuited. Also, it is possible to prevent excess current from being supplied to any particular switching power supply by the effect of the Zener diode Dz and the addition resistor network R23,24. This further makes it possible to minimize the output voltage variation in the power supply system.

In the current sharing control system of a power supply described above, if, for example, any concurrently running switching power supply fails due, for example, to short circuiting, an electric current flows into that particular switching power supply from the other normal switching power supplies, thereby causing a drop in the output voltage of the power supply system. Furthermore, for example, if one of the concurrently switching power supplies is in an "OFF" state, the output voltage of each of the other active switching power supplies is applied across the output terminals OUT+ and OUT− of the inactive switching power supply. Hence, the output voltage sensing circuit detects the output voltage, and an output voltage sensing signal Vs corresponding to the output voltage is at all times applied to the negative input terminal of error amplifier U1. Accordingly, the output voltage of the inactive switching power supply may overshoot or undershoot, when the power supply is turned "ON", for example. The foregoing phenomenon can be avoided, for example, by adding a protection circuit to the output voltage sensing circuit of each of the plurality of parallel connected switching power supply.

Figure 8:
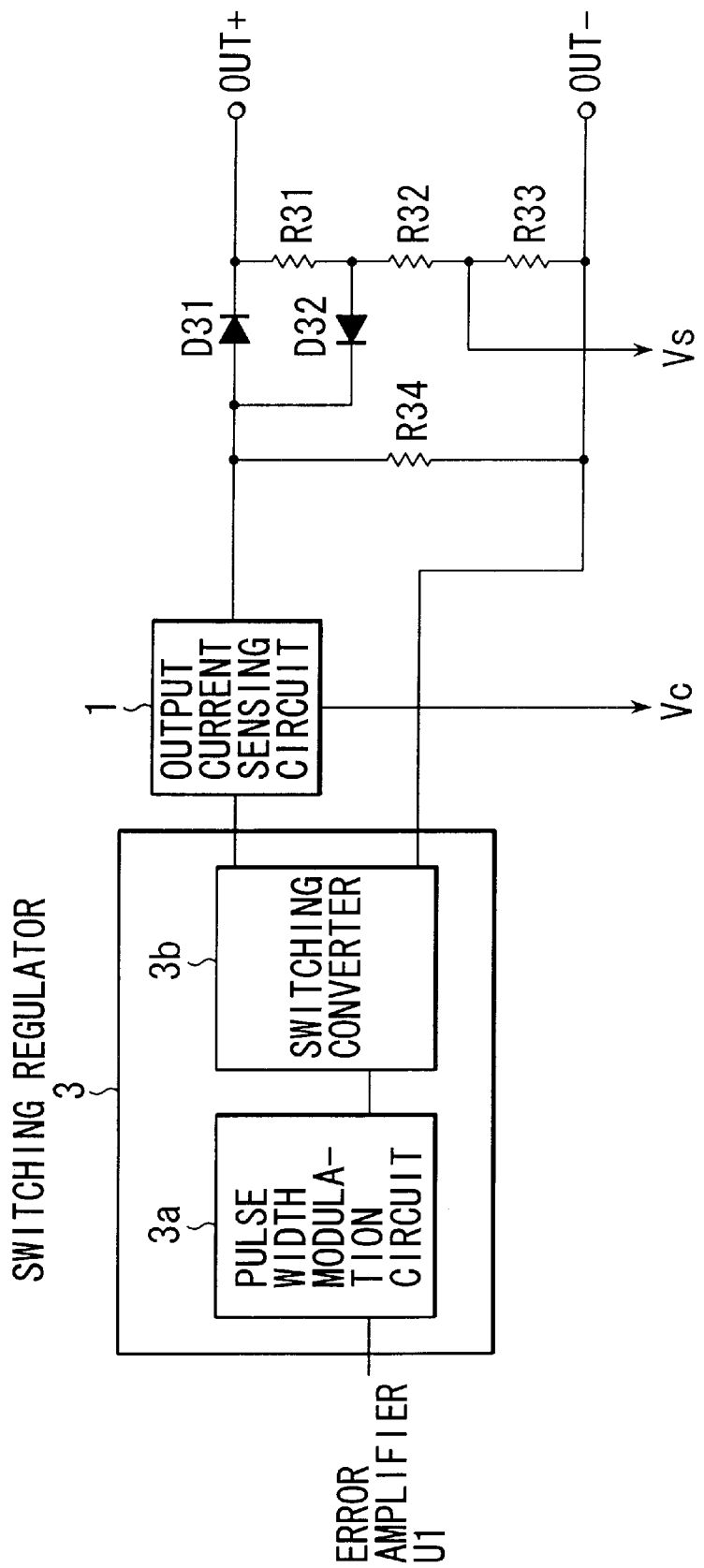
FIG. 8 is a block diagram depicting an output voltage sensing circuit of the invention.

FIG. 8 shows an example of an output voltage sensing circuit that makes it possible to avoid the foregoing phenomenon and can be used for the switching power supplies of the current sharing control system of a power supply. FIG. 8 is a partial view showing the output block of the switching power supply shown in FIG. 3. Hence, components identical to that shown in FIG. 3 are provided the same reference symbols and will be omitted from discussion here at for sake of clarity.

In FIG. 8, the positive output terminal of a switching converter 3b is connected to an output terminal OUT+ through a diode D31. The negative output terminal of switching converter 3b is connected to an output terminal OUT−. The anode of diode D31 and the output terminal OUT− are connected via resistor R34. The cathode of diode D31 and the output terminal OUT− are connected through voltage dividing resistors R31,R32, and R33. The common junction between the voltage dividing resistors R31 and R32 and the anode of diode D31 are connected through diode D32. The potential at the common junction between the voltage dividing resistors R32 and R33 is outputted as an output voltage sensing signal Vs.

In the output voltage sensing circuit, the diode D31 blocks a reverse current flowing from output terminal OUT+, when, for example, the switching power supply fails due to short circuiting. Furthermore, diode D32 and resistor R34 operate so as to lower the level of the output voltage sensing signal Vs when, for example, the switching power supply is in an OFF state. Hence, it is possible to avoid the above described phenomenon.

In the description above, only specific preferred embodiments are provided for the purpose of describing the invention and showing examples of carrying out the invention. The above embodiments are thus to be considered as illustrative and not restrictive. The invention may be embodied in other ways without departing from the spirit and essential character thereof. Accordingly it is to be understood that all modifications and extensions falling within the spirit and scope of the invention are covered by the claims appended hereto.

Figure 6:
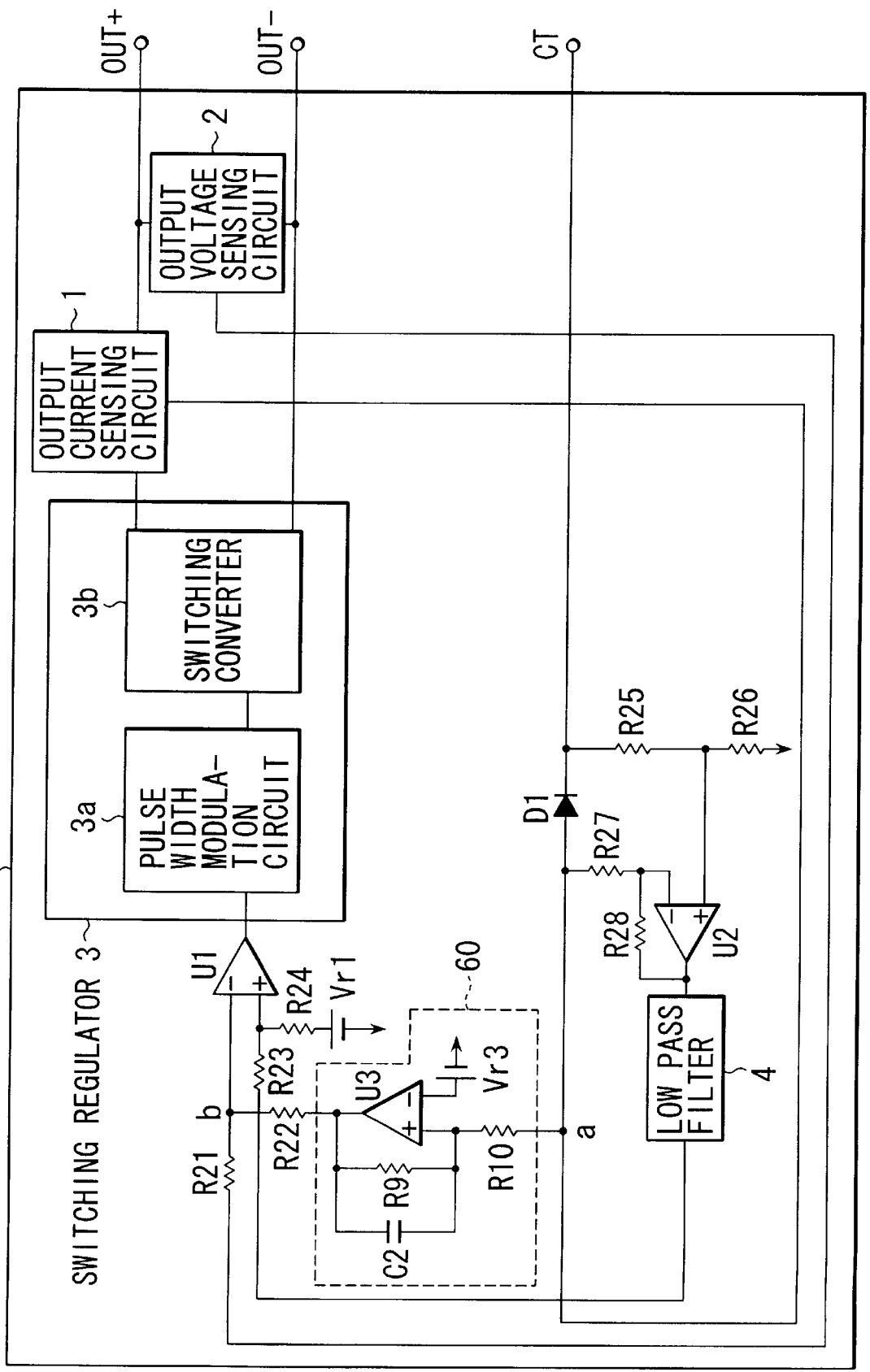
FIG. 6 is a block diagram depicting a Zener diode of the invention.

For example, the Zener diode Dz may be realized by using a circuit enclosed by a dotted line and indicated by numeral 60 in FIG. 6. In circuit 60, the positive input terminal of error amplifier U3 is connected to a connection point "a" through a resistor R10. The negative input terminal of error amplifier U3 is connected to a reference voltage Vr3. The output terminal of error amplifier U3 is connected to both resistor R22 and to the positive input terminal thereof through a feedback resistor R9 and capacitor C2. By using circuit 60 in place of Zener diode Dz, it is possible to precisely set a voltage level corresponding to a certain current level determined by the Zener voltage of Zener diode Dz. In circuit 60, such a voltage level appropriate to the Zener voltage is set in reference voltage Vr3.

As discussed, the invention enjoys the following and other advantages: The current sharing control system of a power supply of the invention enables the output voltage variation to be minimized against sudden changes in the load. Hence, it is possible to prevent the output voltage variations that may occur when any single switching power supply fails or is connected or disconnected, while the power line is active. It is also possible with the invention to control the output voltage variation to within a certain range against the open circuiting or short circuiting of the system parallel operation control signal which is a common signal.

What is claimed is:

1. A current sharing control system of a power supply, wherein a plurality of switching power supplies are connected in parallel to feed DC power to an external load, each of said switching power supplies comprising:

output current sensing means for obtaining a signal corresponding to an output current of said power supply;

ideal diode circuit means comprising an anode and a cathode, said anode being coupled to said signal corresponding to said output current of said power supply, and said cathode being coupled to a signal corresponding to maximum output current of said plurality of switching power supplies connected in parallel;

error amplifier means for outputting an error signal representing difference between potentials at said anode and said cathode of said ideal diode circuit means; and output voltage regulation means for adjusting output voltage thereof to cancel said error signal.

2. A current sharing control system of a power supply, wherein a plurality of switching power supplies are connected in parallel to feed DC power to an external load, each of said switching power supplies comprising:

output current sensing means (1) for outputting an output current sensing signal (Vc) corresponding to output current of said power supply;

output voltage sensing means (2) for outputting an output voltage sensing signal (Vs) corresponding to output voltage of said power supply;

ideal diode circuit means comprising an anode and a cathode, said anode coupled to said output current sensing signal (Vc) and said cathode coupled to a parallel operation control signal terminal (CT);

first error amplifier means (U2) for outputting a comparison signal representing difference between a signal applied to said anode of said ideal diode circuit means (D1) and said output current sensing signal (Vc);

low pass filter means (4) connected to an output terminal of said first error amplifier means (U2);

second error amplifier means (U1) for adding output of said low pass filter means (4) to a reference voltage (Vr1) and for then outputting a comparison signal representing difference between resulting addition signal and said output voltage sensing signal (Vs); and switching regulator means (3) for controlling output voltage thereof according to said comparison signal from said second error amplifier means (U1).

3. The system of claim 2, wherein output terminals (OUT− and OUT+) and parallel operation control signal terminals (CT) of said plurality of said switching power supplies are connected in parallel.

4. The system of claim 2, wherein said ideal diode circuit means comprises:

a third error amplifier means (U4) comprising a positive input terminal connected to an input terminal (41); and a first diode comprising a first anode and a first cathode, said first anode connected to an output terminal of said third error amplifier means (U4) and said first cathode connected to a negative input terminal of said third error amplifier means (U4) and an output terminal (43).

5. The system of claim 2, wherein said low pass filter means (4) is connected to receive feed back of an output signal from said first error amplifier means (U2) through a capacitor (C1).

6. The system of claim 2, wherein said low pass filter means (4) is connected to a positive input terminal of said second error amplifier means (U1) and to a common potential line through a capacitor (C3).

7. The system of claim 2, wherein a negative input terminal of said second error amplifier means (U1) and said anode of said ideal diode circuit means (D1) are connected together using a Zener diode (Dz).

8. An output voltage sensing circuit for detecting output voltage of a switching power supply, a plurality of said switching power supplies comprising a current sharing control system of a power supply, said sensing circuit comprising:

a first diode (D31) interposed in a forward direction in a path of an output current of said Switching power supply;

resistor means (R34) for connecting an anode of said first diode (D31) and an output terminal (OUT−) of said switching power supply;

voltage dividing resistor means (R31,R32, R33) for dividing voltage developed across a cathode of said first diode (D31) and an output terminal (OUT−) of said switching power supply; and a second diode (D32) comprising an anode coupled to receive voltage divided by said voltage dividing resistor means (R31,R32, R33), and a cathode connected to an anode of said first diode (D31).

\* \* \* \* \*